US006354464B1

(12) United States Patent
Smith et al.

(10) Patent No.: US 6,354,464 B1
(45) Date of Patent: Mar. 12, 2002

(54) GASOLINE DISPENSING SYSTEM AND METHOD WITH AUTOMATIC DISPENSING SHUTOFF

(75) Inventors: Richard M. Smith; M. Dale Godfrey, both of Salisbury, MD (US)

(73) Assignee: Dresser, Inc

( * ) Notice: Subject to any disclaimer, the term of this patent is extended or adjusted under 35 U.S.C. 154(b) by 0 days.

(21) Appl. No.: 09/620,273

(22) Filed: Jul. 19, 2000

(51) Int. Cl.$^7$ .................................................. G01F 11/06
(52) U.S. Cl. ............................... 222/1; 222/71; 222/73; 222/75
(58) Field of Search .............................. 222/71, 73, 74, 222/75, 1

(56) References Cited

U.S. PATENT DOCUMENTS

| | | | | |
|---|---|---|---|---|
| 3,513,887 A | | 5/1970 | Limandri | 141/207 |
| 3,548,893 A | | 12/1970 | Moore et al. | 141/208 |
| 4,646,773 A | | 3/1987 | Klop et al. | 137/68.1 |
| 5,004,023 A | | 4/1991 | Monticup, Jr. et al. | 141/208 |
| 5,099,870 A | | 3/1992 | Moore et al. | 137/71 |
| 5,102,012 A | * | 4/1992 | Foster | 222/40 |
| 5,299,607 A | | 4/1994 | Monticup, Jr. | 141/208 |
| 5,363,988 A | * | 11/1994 | Saxton et al. | 222/14 |
| 5,385,182 A | | 1/1995 | Dyer | 141/392 |
| 5,794,667 A | * | 8/1998 | Payne et al. | 222/71 |
| 6,050,297 A | | 4/2000 | Ostrowski et al. | 137/614.04 |
| 6,109,477 A | * | 8/2000 | Myers et al. | 222/1 |
| 6,149,033 A | * | 11/2000 | Poleshuk | 222/75 |
| 6,227,409 B1 | * | 5/2001 | Brown | 222/1 |

* cited by examiner

*Primary Examiner*—Joseph A. Kaufman
(74) *Attorney, Agent, or Firm*—Jenkens + Gilchrist, P.C.

(57) ABSTRACT

A gasoline dispensing system and method according to which one end of a dispensing hose is connected to a source of gasoline, and a nozzle is connected to the other end of the hose for dispensing the gasoline. A conductor is connected to a source of energy to cause the energy to be transmitted flow through the conductor. The conductor extends through the length of the hose and the dispensing of the gasoline is terminated when current ceases to flow through the conductor as a result of it breaking in response to a drive-off, or the like.

35 Claims, 1 Drawing Sheet

GASOLINE DISPENSING SYSTEM AND METHOD WITH AUTOMATIC DISPENSING SHUTOFF

BACKGROUND

This invention relates to gasoline dispensing system and method and, more particularly, to such a system and method which responds to a predetermined tensile stress being applied to the dispensing hose and shuts off the gasoline flow to prevent spillage of the gasoline.

Service stations equipped with one or more gasoline dispensing units have a problem with vehicle "drive-offs", e.g., vehicles pulling away from the dispensing unit with the dispensing nozzle still inserted in the vehicle's tank, or with the nozzle or dispensing hose otherwise secured or hung on the vehicle. Such incidents usually result in breakage of the dispensing hose, and/or the hose disconnecting from the dispensing unit. This can cause fuel spillage which, of course, creates a potentially hazardous condition. These problems are compounded in connection with service stations which also include a system for recovering vapor in the vehicle tanks when the gasoline is dispensed into the tank and routing the recovered vapor to the storage tank for the gasoline.

Although not mandated, breakaway couplings have been designed for these types of systems. However, most of them are less than satisfactory since they are relatively heavy, bulky and expensive, and often impede the flow of the fuel and/or vapor to and from the dispensing unit.

Therefore, what is needed is system and method which disengages and terminates the flow of fuel and vapor from a gasoline dispensing unit in response to the dispensing hose breaking, stretching, or disconnecting from the gasoline dispensing housing, yet is light, compact and inexpensive and does not impede the flow of fuel or vapor.

SUMMARY

According to an embodiment of the system and method of the present invention, one end of a dispensing hose is connected to a source of gasoline, and a nozzle is connected to the other end of the hose for dispensing the gasoline. A conductor is provided that is connected to a source of energy to cause the energy to be transmitted through the conductor. The conductor extends through the length of the hose and the dispensing of the gasoline is terminated when current ceases to flow through the conductor.

The system and method of the present invention thus enjoy the advantage of immediately terminating the flow of gasoline through a gasoline dispensing unit in response to the dispensing hose breaking, stretching, or disconnecting from the gasoline dispensing housing in response to a drive-off, or the like. The system of the present invention is also inexpensive to manufacture and easy to install and maintain.

BRIEF DESCRIPTION OF THE DRAWING

The drawing is a elevational view of an embodiment of the system of the present invention.

DESCRIPTION OF THE PREFERRED EMBODIMENT

Figure 1:
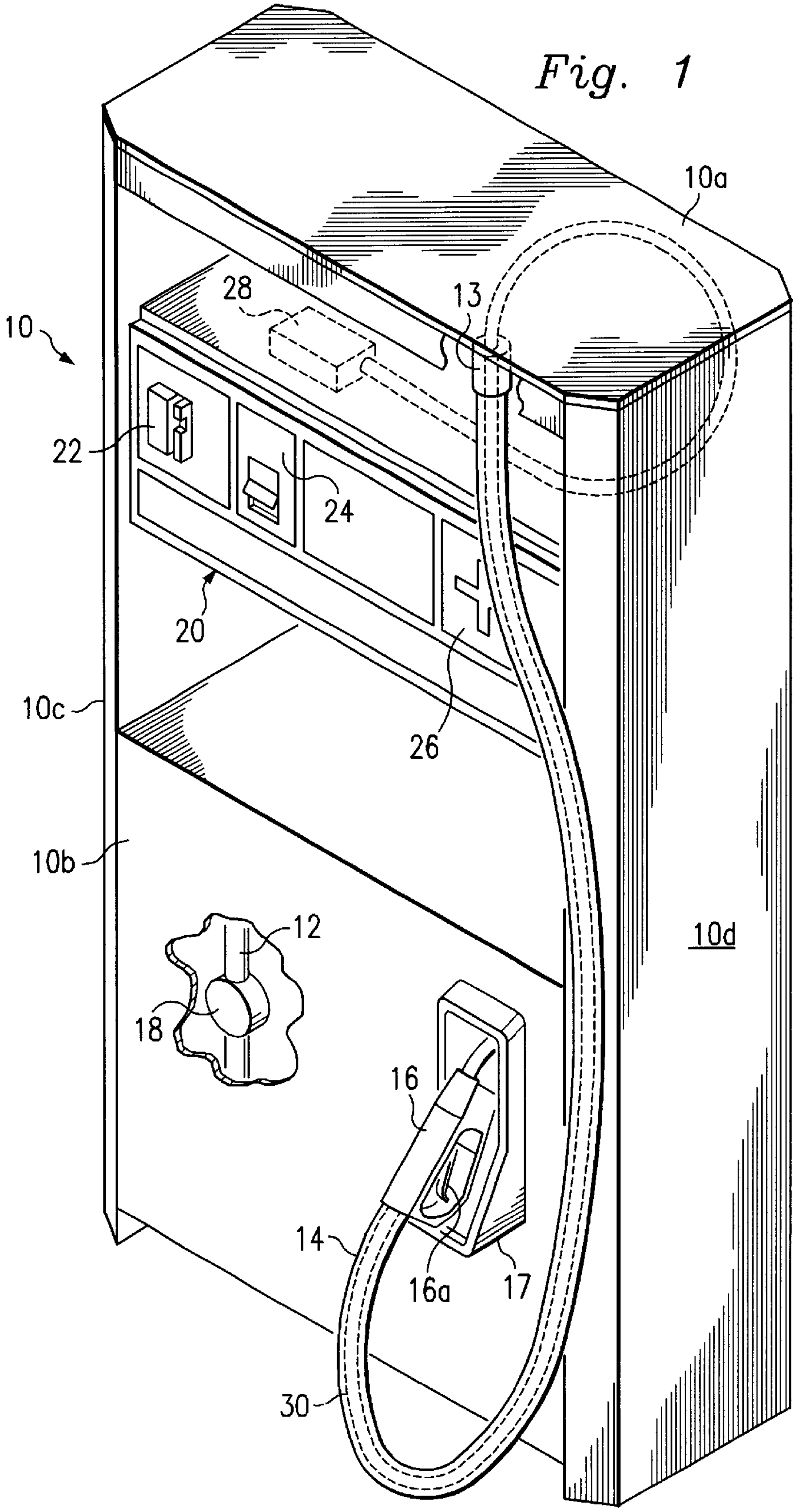

Referring to the drawing, the reference numeral 10 refers, in general, to a gasoline dispenser unit having an upper housing 10*a* and a lower housing 10*b* connected by two spaced upright support members 10*c* and 10*d*.

Hydraulics are provided that include a conduit 12 connected to an underground tank (not shown) for storing the gasoline to be dispensed. The conduit 12 extends from the lower housing 10*b*, through one of the support members 10*c* and 10*d*, to the upper housing 10*a*. Although not shown in the drawing, it us understood that the conduit 12 extends to a fitting 13 is mounted on the lower surface of the upper housing 10*a* for connecting the conduit to one end of a dispensing hose 14 for supplying gasoline to the hose. The other end of the hose 14 is connected to a nozzle 16 for dispensing the gasoline into a vehicle. A main flow valve 18 is provided in the conduit 12 for controlling the flow of the gasoline through the conduit and to the hose 14 for dispensing through the nozzle 16.

The nozzle 16 has a valve (not shown) for controlling the dispensing of the gasoline, which valve is normally closed but can be opened by a trigger, or lever, 16*a* that can be manually actuated in a conventional manner. Alternatively, the trigger 16*a* can be set by the customer to stay open during the dispensing operation without the need for manual actuation, yet will automatically close when the vehicle tank is full. Since this type of nozzle is conventional, it will not be described in any further detail. A boot 17 is provided on the front panel of the lower housing 10*b* for receiving the nozzle 16 during non-use.

An electronics housing 20 is provided between the upper housing 10*a* and the lower housing 10*b*, and contains various electronic components, including a credit card reader 22, a receipt dispenser 24, and a display 26 all of which operate in a conventional manner. The respective fronts of the reader 22, the receipt dispenser 24, and the display 26 extend through the front panel, or bezel, of the housing 20.

A control unit 28, preferably in the form of a computer, microprocessor, or CPU is disposed in the interior of the housing 20. Although not shown in the drawing for the convenience of presentation, it is understood that the control unit 28 is electrically connected to the main valve 18 for controlling the gasoline flow through the conduit 12, and is electrically connected to the reader 22, the receipt dispenser 24, and the display 26 for operating same in a conventional manner.

Although not shown in the drawing, it is understood that a boot, identical to the boot 17, is provided on the opposite, or rear, panel of the housing 10*b* which receives a nozzle, identical to the nozzle 16, which extends from a hose identical to the hose 14. Also, the electronics housing 20 has a rear panel that receives a credit card reader, a receipt dispenser, and a display identical to the reader 22, the dispenser 24, and the display 26, respectively. Since all of this is conventional, it will not be described in further detail.

According to a feature of the invention, conductor 30 is connected, at its respective ends, to a terminal on the control unit 28 which contains a source of energy which is transmitted through the conductor. According to a preferred embodiment, the conductor is an electrical conductor and the energy source is a electrical voltage of a sufficient magnitude to cause an electrical current to flow through the conductor. The magnitude of the voltage and current is relatively low and are such that the current flow is low enough to be intrinsically safe, that is, a spark will not be produced if the conductor 30 should be shorted out. The conductor 30 is designed to break in response to a predetermined tensile stress being placed therein, for reasons to be described.

The two parallel portions of the conductor 30 extend to the fitting 13 where they are anchored, or secured, to the fitting in any known manner. The conductor 30 enters the hose 14 at the fitting and through the length of the hose 14, and to the nozzle 16. At the nozzle 16, the loop formed at the end of the conductor 30 by the parallel conductor portions is connected to the interior of the nozzle in any known manner.

It is understood that the control unit 28 is provided with proper software and programming to monitor the current flow through the conductor 30, respond to the termination of the current flow under conditions to be described, and generate an output signal that shuts off the main flow valve 18.

In operation, the control unit 28 is activated to send a intrinsically safe current through the conductor 30. When a customer parks a vehicle near the dispenser unit 10, inserts the nozzle 16 into the mouth of the vehicle tank, and engages the trigger 16*a*, the dispensing operation will begin. In this example, it will be assumed that the customer sets the trigger 16*a* to stay open during the filling operation without any manual actuation, yet automatically close when the vehicle tank is full.

If during or after the filling operation, it will be assumed that the customer forgets to remove the nozzle 16 from the vehicle tank, but rather drives away from the dispensing unit with the nozzle still inserted in the vehicle's tank, or otherwise secured or hung on the vehicle. The hose 14 will thus stretch, and the conductor 30 will break somewhere between its connections to the nozzle 16 and the fitting 13 when the tensile stress placed thereon exceeds a predetermined amount. When this occurs, the current will cease flowing through the conductor 30 which will be recognized by the control unit 28. The control unit 28 responds to the termination of the current flow and sends a signal to the main valve 18 to shut the valve and thus terminate the flow of gasoline through the conduit 12 and to the hose 14. Thus, even if the drive-away continues to the extent that the hose breaks or its connection to the dispenser unit 10 disconnects, there will be no gasoline spillage.

Of course the above embodiment would also apply to a situation in which the customer manually actuates the trigger 16*a* during the entire dispensing operation but forgets to remove the nozzle 16 from the vehicle tank after the dispensing operation is complete.

It is understood that the fitting 13 can be of a convention design in which it connects the respective ends of the hose 14 and the conduit 12 at the upper housing 10*a*, as described above. Alternatively, it can be in the form of a breakaway fitting such as that disclosed in U.S. Pat. No. 6,050,297, the disclosure of which is hereby incorporated by reference. In the latter case, the design would be such that the conductor 30 will break and the fitting 13 will disconnect at approximately the same time. Alternatively, the conductor 30 can be designed to break before the coupling disconnects.

In the case where multiple hoses are provided, including the above-mentioned hose associated with the rear panel of the dispenser unit 10, the conductor 30 would loop though all of the hoses in series. It is also understood that the above embodiment is equally applicable to gasoline dispensing systems which also include a vapor recovery system.

Several advantages result from the system and method of the present invention. For example, according to the above embodiment, the flow of fuel from a gasoline dispensing unit is terminated in response to a predetermined tensile stress being placed on the hose 14 (and therefore on the conductor 30) before the hose breaks, yet the system of the embodiment is light, compact and inexpensive and does not impede the flow of fuel or vapor through the system.

It is also understood that variations may be made in the foregoing without departing from the scope of the invention. Thus, there can be other forms of energy that are transferred, or transmitted, through other types of conductors. For example, the energy source and the conductor can be part of a fiberoptics system in which case the energy, in the form of light, would be transmitted through the conductor. Also, the energy source can be independent of the control unit 28, and the conductor 30 can be embedded in the wall of the hose 14 rather than extend within the hose. Moreover, the control unit 28 does not have to be in the form of a computer, but can take other forms. Also, references to "conduit", "hose", "tube", and the like are not meant to be limited to any particular fluid flow device and any such device or devices can be used throughout the system. Further, spatial references, such as "upper", "lower", "side", "front", and "rear" are for the purpose of illustration only and does not limit the specific orientation or location of the structure described above. Also, the system and method of the present invention is not limited to a gasoline dispensing system but is equally applicable to any fluid flow system.

Since other modifications, changes, and substitutions are intended in the foregoing disclosure, it is appropriate that the appended claims be construed broadly and in a manner consistent with the scope of the invention.

What is claimed is:

1. A gasoline dispensing system comprising a conduit connected to a source of gasoline, a dispensing hose connected to the conduit, a nozzle connected to the other end of the hose for dispensing the gasoline, a conductor extending along the length of the hose, a source of electrical energy connected to the conductor to cause the energy to be transmitted through the conductor, and a control unit responsive to the termination of the energy transmission for terminating the dispensing of the gasoline.

2. The system of claim 1 wherein the energy transmission terminates in response to a predetermined tensile stress being applied to the conductor.

3. The system of claim 1 wherein the energy source is an electrical voltage and the conductor conducts electrical current.

4. The system of claim 3 wherein the current flow terminates in response to a predetermined tensile stress being applied to the conductor.

5. The system of claim 4 wherein the predetermined tensile stress is a tensile stress sufficient to break the conductor.

6. The system of claim 1 wherein the conductor is mechanically connected to the nozzle so that any tensile stress applied to the hose is also applied to the conductor.

7. The system of claim 6 further comprising a dispenser housing, and a fitting mounted on the dispenser housing for receiving the corresponding ends of the conduit and the hose to connect the conduit to the hose, the conductor also being mechanically connected to the fitting.

8. The system of claim 7 wherein the conductor is adapted to break in response to the tensile stress thereon exceeding a predetermined mount to terminate the current flow through the conductor.

9. The system of claim 8 wherein the tensile stress on the conductor is caused by movement of the nozzle relative to the housing exceeding a predetermined amount.

10. The system of claim 9 wherein the movement of the nozzle relative to the housing also applies a tensile stress to the nozzle.

11. The system of claim 10 wherein the tensile stress that causes the conductor to break is less that the tensile stress that causes the hose to break.

12. The system of claim 10 wherein the hose stretches in response to the application of the tensile stress to it and to the conductor sufficient to cause the conductor to break.

13. The system of claim 10 further comprising means for disconnecting the hose from the fitting in response to a predetermined tensile stress applied to the hose.

14. The system of claim 13 wherein the predetermined tensile stress required to release the connection between the hose and the conduit is substantially equal to the predetermined tensile stress sufficient to break the conductor.

15. The system of claim 1 further comprising a valve connected in the conduit for controlling the flow of gasoline through the conduit, the control unit being electrically connected to the valve for closing the valve and terminating the gasoline flow in response to the termination of the current flow.

16. The system of claim 15 wherein the control unit provides the electrical energy source, responds to the termination of current flow through the conductor, and shuts off the valve.

17. The system of claim 16 wherein the control unit is a computer.

18. The system of claim 1 wherein the conductor extends within the hose.

19. A gasoline dispensing method comprising the steps of connecting one end of a dispensing hose to a source of gasoline, connecting a nozzle to the other end of the hose for dispensing the gasoline, connecting a conductor to a source of energy for transmitting the energy through the conductor, extending the conductor through the length of the hose, and terminating the dispensing of the gasoline when current ceases to flow through the conductor.

20. The method of claim 19 wherein the energy transmission terminates in response to a predetermined tensile stress being applied to the conductor.

21. The method of claim 19 wherein the energy source is an electrical voltage and the conductor conducts electrical current.

22. The method of claim 21 wherein the current flow terminates in response to a predetermined tensile stress being applied to the conductor.

23. The method of claim 19 further comprising the step of mechanically connecting the conductor to the nozzle so that any tensile stress applied to the hose is also applied to the conductor.

24. The method of claim 23 further comprising a dispenser housing, and a fitting mounted on the dispenser housing for receiving the corresponding ends of the conduit and the hose to connect the conduit to the hose, the conductor also being mechanically connected to the fitting.

25. The method of claim 24 wherein the conductor is adapted to break in response to the tensile stress thereon exceeding a predetermined mount to terminate the current flow through the conductor.

26. The method of claim 25 wherein the tensile stress on the conductor is caused by movement of the nozzle relative to the housing exceeding a predetermined amount.

27. The method of claim 26 wherein the movement of the nozzle relative to the housing also applies a tensile stress to the nozzle.

28. The method of claim 27 wherein the tensile stress that causes the conductor to break is less that the tensile stress that causes the hose to break.

29. The method of claim 27 wherein the hose stretches in response to the application of the tensile stress to it and to the conductor sufficient to cause the conductor to break.

30. The method of claim 27 further comprising the step of disconnecting the hose from the fitting in response to a predetermined tensile stress applied to the hose.

31. The method of claim 30 wherein the predetermined tensile stress required to release the connection between the hose and the conduit is substantially equal to the predetermined tensile stress sufficient to break the conductor.

32. The method of claim 19 wherein the conductor is adapted to break in response to the tensile stress thereon exceeding a predetermined mount to terminate the current flow through the conductor.

33. The method of claim 19 further comprising the step of connecting a valve in the conduit for controlling the flow of gasoline through the conduit, the step of terminating comprising the step of electrically connecting a control unit to the valve for closing the valve and terminating the gasoline flow in response to the termination of the current flow.

34. The method of claim 33 wherein the control unit provides the electrical energy source, responds to the termination of current flow through the conductor, and shuts off the valve.

35. The method of claim 19 wherein the conductor extends within the hose.

* * * * *